United States Patent
Hellwig

[11] Patent Number: 5,992,831
[45] Date of Patent: Nov. 30, 1999

[54] STABILIZER FOR LEAF SPRING SUSPENSION

[75] Inventor: Donald J. Hellwig, Cayucos, Calif.

[73] Assignee: Hellwig Products Company, Inc., Visalia, Calif.

[21] Appl. No.: 09/083,752

[22] Filed: May 22, 1998

[51] Int. Cl.⁶ .................................................. B60G 11/04
[52] U.S. Cl. ....................... 267/45; 267/48; 280/124.174
[58] Field of Search ..................... 280/124.174, 124.175, 280/124.17; 267/45, 47, 48

[56] References Cited

U.S. PATENT DOCUMENTS

| | | | |
|---|---|---|---|
| 1,215,122 | 2/1917 | Crook | 267/45 |
| 1,325,604 | 12/1919 | Andrew | 267/45 |
| 1,444,266 | 2/1923 | Parker | 267/47 |
| 1,590,211 | 6/1926 | Simons | 267/47 |
| 1,859,105 | 5/1932 | Munro | 267/47 |
| 1,866,677 | 7/1932 | Seymour | 267/48 |
| 2,468,364 | 4/1949 | Gauvey | 267/45 |
| 2,762,445 | 9/1956 | Polhemus et al. | 280/124.175 |
| 2,884,241 | 4/1959 | Farchmin | 267/48 |
| 4,208,044 | 6/1980 | Schoenfeld | 267/48 |

*Primary Examiner*—Peter C. English
*Attorney, Agent, or Firm*—Oppenheimer Wolff & Donnelly LLP

[57] ABSTRACT

A leaf spring suspension device for stabilizing a multi-leaf type vehicle spring connected to the axle of the vehicle including a unitary length of metallic spring material adapted to be connected directly to the multiple-leaf type vehicle spring at opposite ends thereof forwardly and rearwardly of the axle connection. The length of spring material has a raised area at generally the midpoint thereof spaced from the uppermost leaf of the vehicle spring when mounted thereto and a plurality of springs of varying lengths mounted between the unitary length of spring material and the vehicle spring configured similarly thereto. The plurality of springs also have a raised area conforming to the raised area of the length of spring material forming space between the uppermost leaf of the vehicle spring and the lowermost one of the plurality of springs when coupled to the vehicle spring. A bracket is mounted on top of the unitary length of spring material at generally the center thereof spanning the raised area thereof and generally conforming to the configuration of the unitary length of spring material at its raised area.

7 Claims, 3 Drawing Sheets

STABILIZER FOR LEAF SPRING SUSPENSION

BACKGROUND OF THE INVENTION

The present invention relates generally to vehicle spring suspensions and more particularly is adapted to a leaf spring suspension device suitable for attachment to vehicle rear suspension springs.

It is the usual practice to isolate the rear axle of a vehicle from the frame of the vehicle by supporting the axle in a multi-leaf type spring which is suspended between a forward bearing bracket and a rearward spring shackle whereby most imperfections in the road surface can be absorbed by the wheel and the spring construction and not be transmitted to the vehicle passenger compartment through the frame. The multi-leaf type of spring is characterized by a plurality of stacked leafs, usually four or five in number, which decrease in length away from the base or mounting leaf in the form of a truncated triangular configuration. The axle suspension connects to the thickest or highest part of the multi-leaf spring to achieve maximum support.

Occasionally, when a vehicle is utilized to carry especially heavy loads, the existing leaf springs have a tendency to sag or flex sufficiently to wrap-up or permit "bottoming." Also, upon unusual wear or unusual surface conditions, the existing springs could allow "forward pitch" or "nose dive" of the vehicle, all to the discomfort of the passengers.

In order to enhance the load bearing capabilities of light pickups, trucks, or the like, prior art stabilizing devices have been proposed. Such prior art devices are either made up of a large number of parts, do not adapt easily to preexisting structure or are not totally effective in compensating for heavy loads on the vehicle's suspension system.

FIG. 4 is a prior art illustration of a multi-leaf spring 10b similar to leaf spring 10 of FIG. 1. Like numerals refer to like parts of FIG. 1. Here, instead of brackets 17 and 18 as in FIG. 3, spaced brackets 170 (only 1 visible in FIG. 4) encircle pre-existing axle 171 having spaced legs 172, 173 terminating in threaded ends 174, 175, respectively, receivable in spaced holes 176, 177, respectively, in bracket plate 178. Conventional threaded nuts 179 and washers 180 are used to secure brackets 170 to plate 178.

As indicated by arrow 181, the direction of torque taking place on axle 171 is illustrated. This torque, as indicated by arrows 182, 183 (assuming spring 10b is mounted to the vehicle as in FIG. 3), causes wrap-up of the spring 10b which provides sag or flex sufficient to bottoming out of spring 10b.

There is a need for a leaf spring suspension device that is quickly and easily adaptable to the preexisting leaf spring of a vehicle, such as light body pick up truck, and that is effective and has relatively low number of parts.

SUMMARY OF THE INVENTION

It is an object of this invention to provide a leaf spring suspension device that can be quickly and easily mounted to the preexisting leaf spring suspension of a vehicle.

It is a further object of this invention to provide such a leaf spring suspension device which has a relatively low number of parts.

It is still further an object of this invention to provide a kit for carrying out the foregoing objects.

It is another object of this invention to provide a soft controlled ride when a vehicle is not loaded and is provided with the suspension device of the invention.

It is a further object of this invention to provide such a suspension device which progressively reacts to increasing loads on the vehicle by engaging the rolling arch main leaf. That is, as the load increases, the spring rate of the compound bent main leaf increases.

These and other objects are preferably accomplished by providing a leaf spring suspension device for stabilizing a multi-leaf type vehicle spring connected to the axle of the vehicle including a unitary length of metallic spring material adapted to be connected directly to the multi-leaf type vehicle spring at opposite ends thereof forwardly and rearwardly of the axle connection. The length of spring material has a raised area at generally the midpoint thereof spaced from the uppermost leaf of the vehicle spring when mounted thereto and a plurality of springs of varying lengths mounted between the unitary length of spring material and the vehicle spring and configured similarly thereto. The plurality of springs also have a raised area conforming to the raised area of the length of spring material forming a space between the uppermost leaf of the vehicle spring and the lowermost one of the plurality of springs when coupled to the vehicle spring.

A bracket is mounted on top of the unitary length of spring material at generally the center thereof spanning the raised area thereof and generally conforming to the configuration of the unitary length of spring material at its raised area. A pair of spaced U-shaped brackets encircle the bracket, the unitary length of spring material, and the plurality of springs and are adapted to secure the unitary length of spring material and the plurality of springs to the multi-leaf type vehicle spring.

DESCRIPTION OF THE PREFERRED EMBODIMENT

Figure 1:
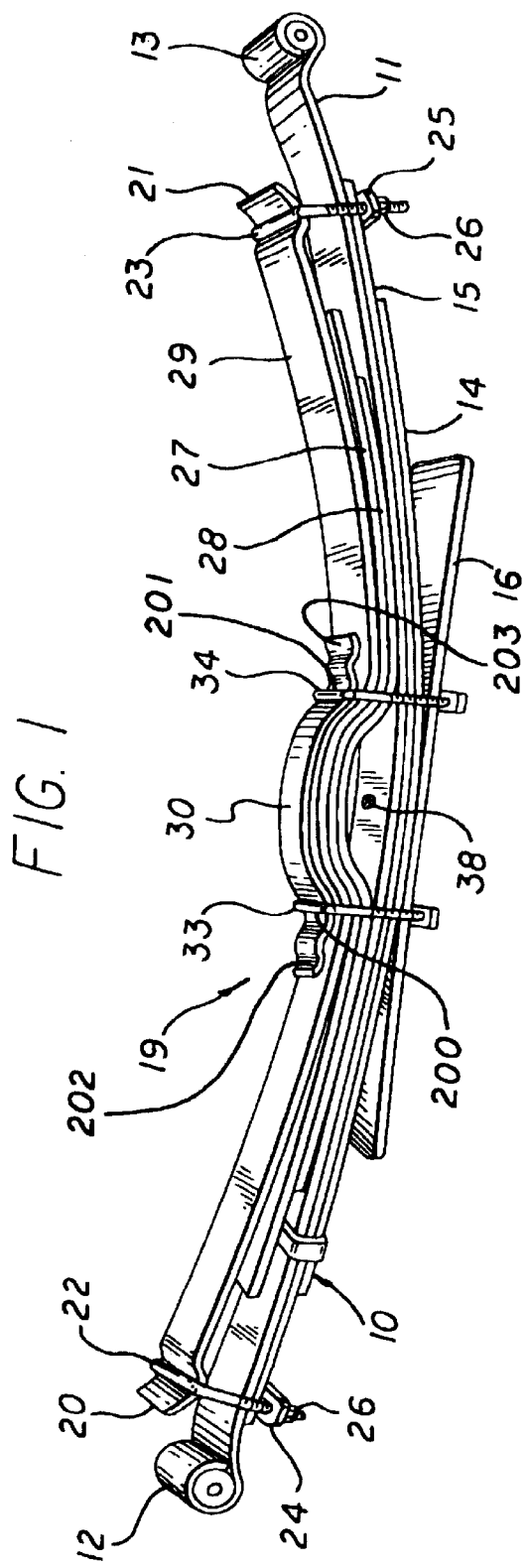
FIG. 1 is a perspective view of a conventional multi-leaf type spring having a leaf spring suspension device mounted thereto in accordance with the teachings of the invention.

Referring now to FIG. 1 of the drawing, a conventional multi-leaf spring 10 having extending along a longitudinal direction is shown an elongated spring member 11 fixed to the vehicle frame (not shown) by means of coiled ends 12, 13 (FIG. 1) coupled to suitable brackets (not shown) on the vehicle frame. Leaf spring 10, as is well known In the art, is comprised of varying lengths of spring members, as spring members 14, 15, 16 which are secured to spring member 11 by suitable U-shaped brackets (see brackets 17, 18 in FIG. 3) which are secured to the vehicle rear axle as is well known in the art. The varying lengths 11, 14, 15, 16 may be secured together at generally the middle thereof by a nut and bolt combination 38.

As particularly contemplated in the present invention, a leaf spring suspension device 19 (see also FIG. 2) is mounted to the preexisting multi-leaf spring 10. As seen in FIG. 1, suspension device 19 includes a spring 29 in the form of an elongated curved length of spring alloy steel or the like bent at opposite ends 20, 21 to provide a gripping portion in which conventional U-shaped threaded bolts 22, 23, respectively, may be disposed. The spaced legs of each bolt 22, 23 are receivable in suitable apertures in brackets 24, 25, respectively, and retained thereto by nuts 26 threaded to the threaded ends of bolts 22, 23.

Suspension device 19 also includes a plurality, such as 2, of curved elongated springs on members 27, 28 disposed between spring 29 and multi-leaf spring 10. Members 27, 28 are of varying lengths as shown. Spring 29 is a unitary length of a leaf of metallic spring material.

Leaf spring suspension device 19 further includes each member 27, 28, 29 being curved at the middle to form a U-shaped raised portion between the preexisting spring member 11 and a short retaining bracket 30. As seen in FIG. 1, the raised portion of spring 29 has a first longitudinal distance with the remainder of spring 29 having a second longitudinal distance, the first longitudinal distance being a fraction of the second longitudinal distance. Spring 29 also extends along the same longitudinal axis and direction as leaf spring 10 and curves away from leaf spring 10 at an angle thereof. Springs 27, 28 extend along the same longitudinal direction of leaf spring 10. Springs 27, 28, and 29 curve away from leaf spring 10. A pair of threaded U-bolts or brackets 33, 34 couple bracket 30 to spring 10. U-bolts 33, 34 are retained to bracket 30 and spring 10 by having their legs receivable in plates 35, 36 (FIG. 2) secured by nuts 37 threaded to the legs of each U-bolt 33, 34. Thus, U-bolts 33, 34 and plates 35, 36 provide bracket means for securing the bracket 30 and springs 27 to 29, 11, 14 and 15 together. As seen in FIG. 1, U-bolts 33, 34 are disposed in grooves 200, 201 formed in respective curved ends 202, 203 of bracket 30. U-bolts 33, 34 thus each are U-shaped bolts having spaced threaded legs 204, 205 (FIG. 2) integral with a bail portion 206. Curved member or spring 27 is a first spring abutting against the length of spring material 29 and is slightly less in overall length than the length of spring material 29. Curved member or spring 28 is a second spring abutting against spring 27 slightly less in overall length than spring 27.

Figure 2:
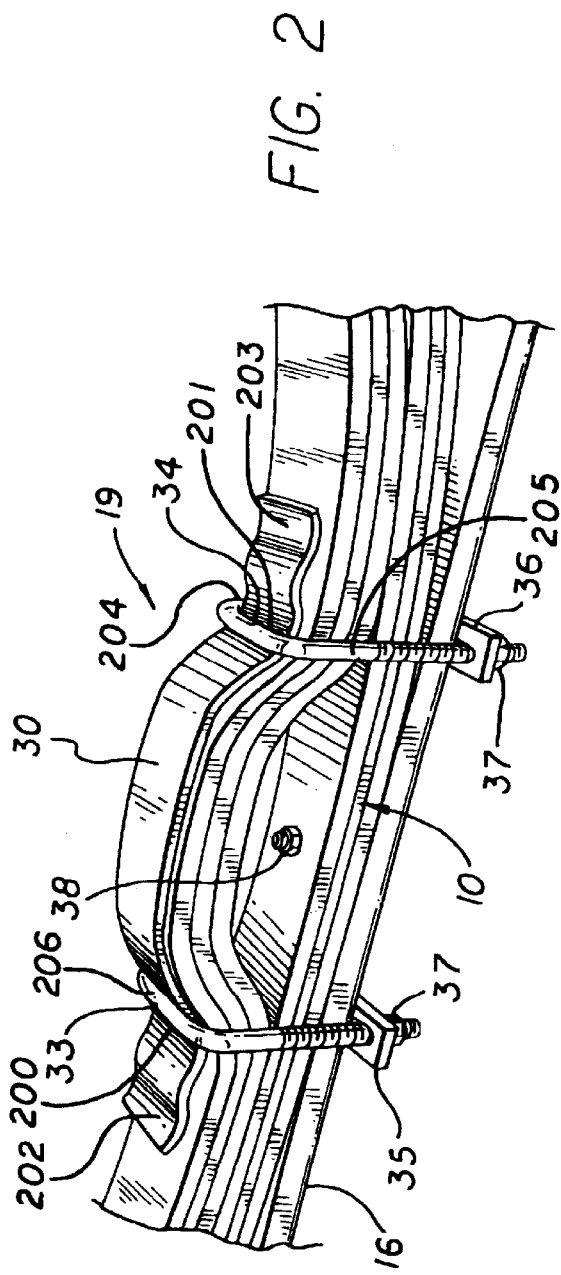
FIG. 2 is a perspective view of a portion of the assembly of FIG. 1.

It can be seen in FIGS. 1 and 2 that a raised area is provided between the top of bracket 30 and the upper surface of spring 11. The curvature of bracket 30 conforms to the curvature of spring, 29. The assembly of parts in FIGS. 1 and 2 eliminates a number of parts in prior art devices, such as a step bracket, a spring plate, U-bolts, nuts and washers. The upper plate or bracket 30 maintains the U-bolts 33, 34 in place so they do not move in or out.

Figure 3:
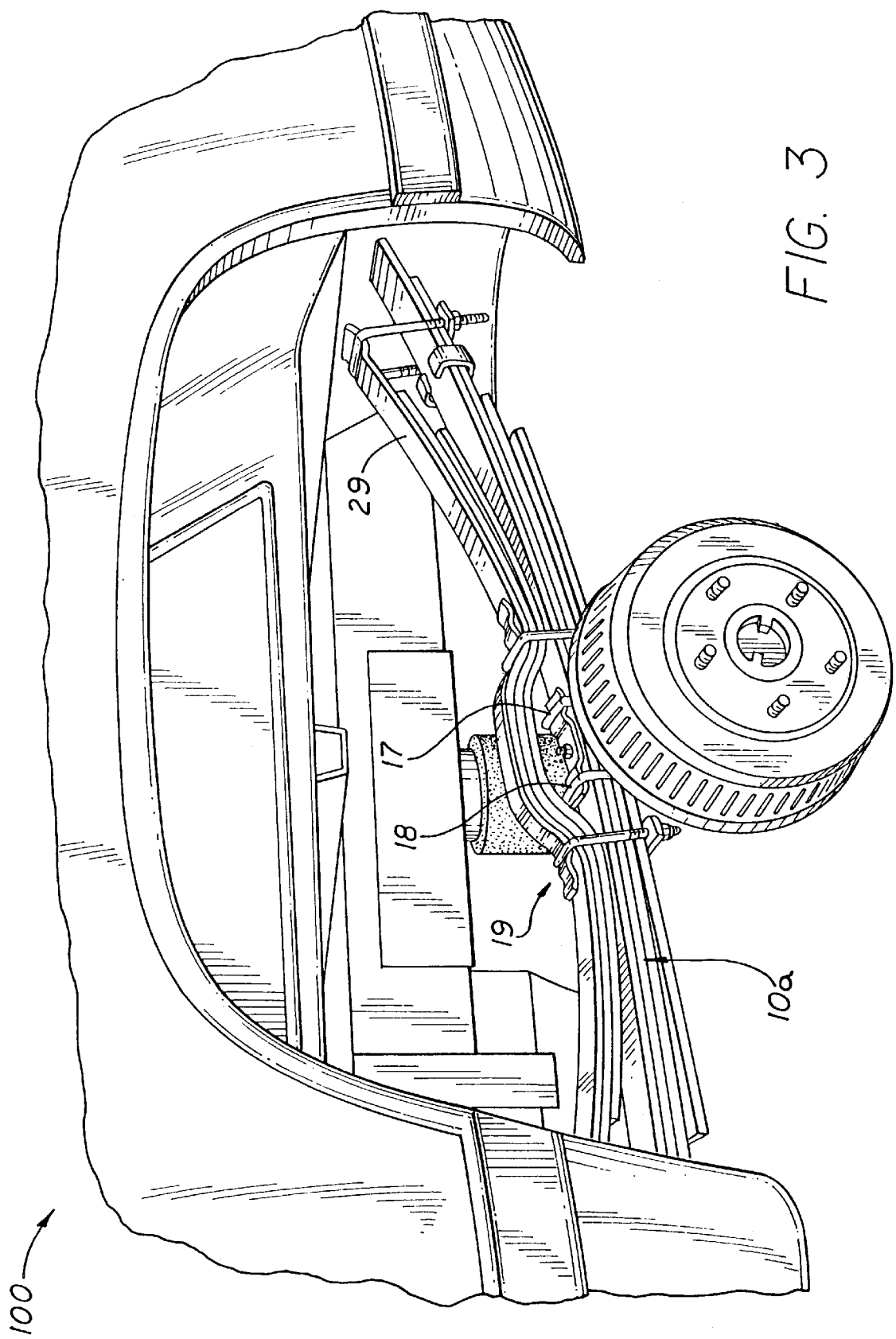
FIG. 3 is a perspective view of a vehicle having the leaf spring suspension device in accordance with the invention mounted therein, parts of the vehicle being removed for convenience of illustration.
Figure 4:
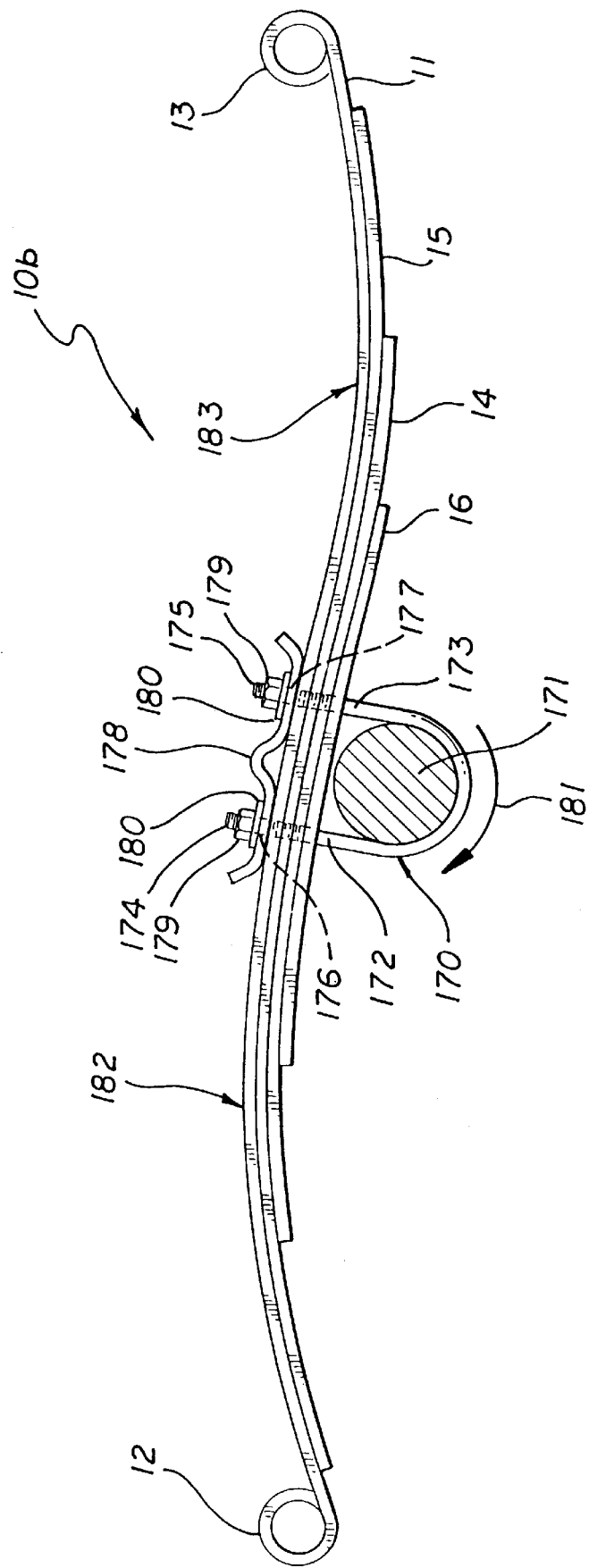
FIG. 4 is a prior art illustration of a conventional leaf spring prior to mounting the device of the invention thereon.

FIG. 3 shows a conventional light pickup truck body 100, with parts removed for convenience of illustration, with a preexisting conventional multi-leaf spring 10a similar to leaf spring 10 of FIGS. 1 and 2 previously installed therein. Leaf spring suspension device 19 is mounted to leaf spring 10a as previously discussed. The leaf spring suspension device 19, added to the preexisting leaf spring of the light pickup truck 100 enhances its load bearing capabilities. The device 19 provides a step or lift while eliminating from the mid-section the step bracket, spring plate, U-bolts, and nuts and washers of prior art devices. This allows the installer to install the same more quickly with simple instructions and with less parts to handle or damage or lose while installing. Also, it is lesser in weight, which makes the kit easier to ship and handle.

The device 19 of the invention, as illustrated in FIG. 1, provides a progressive reaction to increasing loads placed on the vehicle's axle due to device 19's engagement with the main leaf spring 11. As the load increases, the spring rate of the compound bent main leaf increases as seen in FIG. 1.

Although a specific embodiment of the invention is disclosed, variations thereof may occur to an artisan and the scope of the invention should only be limited by the scope of the appended claims.

I claim:

1. A load assistance device and multi-leaf vehicle spring combination for increasing a vehicle's ability to carry loads by stabilizing the multi-leaf vehicle spring connected to an axle of a vehicle comprising:

said multi-leaf vehicle spring extending along a longitudinal direction;

a unitary length of metallic spring material connected directly to the multi-leaf vehicle spring at opposite ends thereof forwardly and rearwardly of an axle connection thereof, said length of spring material having a single raised area at generally the midpoint thereof spaced from an uppermost leaf of said multi-leaf vehicle spring; said raised area having a first longitudinal distance, the remainder of said length of spring material having a second longitudinal distance, said first longitudinal distance being a fraction of said second longitudinal distance;

said length of metallic spring material extending along the same longitudinal direction as said multi-leaf vehicle spring and adjacent thereto but curved away from said multi-leaf vehicle spring at an angle thereof;

a plurality of springs of varying lengths mounted between said unitary length of spring material and said multi-leaf vehicle spring and extending along the same longitudinal direction of said multi-leaf vehicle spring, and said plurality of springs also having a raised portion conforming and being adjacent to the raised area of said length of spring material and forming a space between the uppermost leaf of spring vehicle spring and the lowermost one of said plurality of springs when coupled to said multi-leaf vehicle spring;

a bracket mounted on top of said unitary length of spring material at generally the center thereof spanning the raised area and substantially conforming to the configuration of said unitary length of spring material at its raised area; and a coupling means encircling said bracket, said unitary length of spring material and said plurality of springs and coupling said bracket, said unitary length of spring material and said plurality of springs to said multi-leaf vehicle spring.

2. The combination of claim 1 wherein said length of spring material is curved at opposite ends forming gripping portions to receive a pair of U-bolts therein for securing said device to said vehicle spring.

3. The combination of claim 1 wherein said plurality of springs comprise a first spring abutting against said unitary length of spring material and a second spring abutting against said first spring.

4. The combination of claim 1 wherein said bracket is curved at opposite ends thereof providing spaced grooves for receiving said coupling means therein.

5. The combination of claim 4 wherein said coupling means comprise a pair of U-shaped brackets each having a bail portion receivable in a respective one of said spaced grooves of said bracket and spaced threaded legs extending downwardly from said bail portion adapted to be secured to a respective mounting plate disposed below said vehicle spring.

6. The combination of claim 1 wherein said bracket comprised spaced grooves and said coupling means comprise a pair of U-shaped brackets each having a bail portion receivable in a respective one of said spaced grooves provided in said bracket and spaced threaded legs extending downwardly from said bail portion adapted to be secured to a respective mounting plate disposed below said vehicle spring.

7. The combination of claim 1 wherein said plurality of springs comprise a first spring having a length less than said length of spring material and a second spring having a length less than said first spring.

* * * * *